United States Patent
Fernandez Orive (10) Patent No.: US 11,318,528 B2
(45) Date of Patent: May 3, 2022

(54) METHOD AND APPARATUS FOR MAKING SAND CORES

(71) Applicant: Loramendi, S. Coop., Vitoria-Gasteiz (ES)

(72) Inventor: Luis Alfonso Fernandez Orive, Vitoria-Gasteiz (ES)

(73) Assignee: LORAMENDI, S. COOP., Vitoria-Gasteiz (ES)

( * ) Notice: Subject to any disclaimer, the term of this patent is extended or adjusted under 35 U.S.C. 154(b) by 38 days.

(21) Appl. No.: 17/100,039

(22) Filed: Nov. 20, 2020

(65) Prior Publication Data
US 2021/0069774 A1    Mar. 11, 2021

Related U.S. Application Data

(63) Continuation of application No. PCT/ES2019/070407, filed on Jun. 11, 2019.

(30) Foreign Application Priority Data

Jun. 13, 2018  (EP) .................................... 18382417

(51) Int. Cl.
*B22C 9/10* (2006.01)
*B33Y 10/00* (2015.01)
(Continued)

(52) U.S. Cl.
CPC ................ *B22C 9/10* (2013.01); *B22C 9/123* (2013.01); *B33Y 10/00* (2014.12); *B33Y 30/00* (2014.12); *B33Y 80/00* (2014.12)

(58) Field of Classification Search
CPC .. B22C 9/00; B22C 9/10; B22C 9/123; B22C 9/12; B22C 9/126; B33Y 10/00; B33Y 30/00; B33Y 80/00
See application file for complete search history.

(56) References Cited

FOREIGN PATENT DOCUMENTS

| CN | 105344941 A | 2/2016 |
|---|---|---|
| CN | 106123520 A | 11/2016 |

(Continued)

OTHER PUBLICATIONS

International Search Report and Written Opinion received in international application No. PCT/ES2019/070407, dated Sep. 26, 2019 (14 pages).

(Continued)

*Primary Examiner* — Kevin P Kerns
*Assistant Examiner* — Steven S Ha
(74) *Attorney, Agent, or Firm* — Edell, Shapiro & Finnan, LLC (57) ABSTRACT

Method and installation for making sand cores. The method includes a generating step which is implemented in a first station of the installation, in which the cores are generated with the desired shape in an inner space demarcated by a job box by means of 3D manufacturing, in which layers of a granular material and of an additive that solidifies the granular material are applied in an alternating manner on a platform of the job box. The method also includes a subsequent hardening step which is implemented in a second station of the installation, in which the cores generated in the generating step are hardened. In the hardening step, in order to harden the previously generated cores microwaves and a drying stream are applied in the inner space of the job box.

9 Claims, 5 Drawing Sheets (51) Int. Cl.
*B33Y 30/00* (2015.01)
*B33Y 80/00* (2015.01)
*B22C 9/12* (2006.01)

(56) References Cited

FOREIGN PATENT DOCUMENTS

| | | | |
|---|---|---|---|
| CN | 108007096 A | 5/2018 | |
| EP | 0494762 A2 | 1/1992 | |
| EP | 2907601 A1 | 2/2015 | |
| JP | 58173055 A * | 10/1983 | ............... B22C 9/12 |
| WO | 2017152348 A1 | 9/2017 | |

OTHER PUBLICATIONS

Extended European Search Report received in European application No. EP18382417 6, dated Oct. 17, 2018 (8 pages).

* cited by examiner

METHOD AND APPARATUS FOR MAKING SAND CORES

CROSS-REFERENCE TO RELATED APPLICATIONS

This application relates to and claims the benefit and priority to International Application No. PCT/ES2019/070407, filed Jun. 11, 2019, which relates to and claims the benefit and priority to European Application No. EP18382417.6, filed Jun. 13, 2018.

TECHNICAL FIELD

The present invention relates to methods and installations for making sand cores, in particular to manufacturing methods using 3D manufacturing (also known as additive manufacturing).

BACKGROUND

Sand cores are generally made in a conventional sand making machine, where a mold defines the shape of the core (or of the cores) to be made in each making cycle. The material used to make the cores is then poured into the mold, and the material is hardened or cured to yield a solidified result. The result is the sand core. The material used is a granular material (a type of sand) mixed with at least one additive or binder (a type of resin, for example). Examples of machines in which sand cores are made in that way can be seen in EP0494762A2 and EP2907601A1, for example, the latter of which belongs to the applicant of the present application.

Use of another method for making sand cores has recently come about, i.e., 3D manufacturing (also known as additive manufacturing). In 3D manufacturing, the objects (cores) are made from a granular material (usually sand) and an additive that solidifies the granular material in a generating step. The granular material and the additive are arranged in a job box on a platform or base of the job box in layers applied in an alternating and selective manner, the layers of the additive being applied only on the granular material of interest (and depending on the shape of the object to be made). At the end of the process, the objects made and solidified by means of the additive are located in the job box, but so is the granular material that was not impregnated with the additive (unsolidified granular material or excess granular material). Therefore, it is common to separate the objects from the excess granular material, i.e., the objects must be cleaned.

Even though the objects made in that way are in a solid state, they are generally brittle and many times cannot be easily handled to separate them from the excess granular material, since there is a high risk of breaking them. It is thereby common to add a hardening step applied on the objects before cleaning them, after the generating step, to render the objects less brittle. After the hardening step, it is safer to clean the objects.

CN105344941A discloses a hardening step for cores made by means of 3D manufacturing. To that end, the job box is introduced in a microwave oven, and the previously made objects (cores) are dried and hardened in the microwave oven.

SUMMARY

Provide is a method and an installation for making sand cores.

A first aspect relates to a method for making sand cores. The method comprises a generating step in which at least one core is generated with the desired shape by means of the 3D manufacturing (also known as additive manufacturing). In 3D manufacturing, a plurality of layers of a granular material and of the material needed to generate the core are applied in an alternating and selective manner. In the method, the layers are applied in an inner space of a job box, on a platform of the job box.

The method further comprises a hardening step in which the core generated in the generating step is hardened, with the core arranged in the inner space of the job box. The generating step is implemented with the job box in a first station of an installation, and the hardening step is implemented in a second station of the installation. The job box is conveyed to the second station where the hardening step is implemented, after the generating step is performed in the first station.

In the hardening step, in order to harden the core microwaves and a drying stream are applied in the inner space of the job box where the core is arranged. The material used for generating cores contains water, and the microwaves successfully move the particles of the water, evaporating it. In addition to contributing to the drying, the drying stream entrains the evaporated water which is discharged from the area around the cores. The combination of the microwaves and the drying stream thereby involves an increase in core drying effectiveness, and therefore core hardening, so it allows a safer subsequent cleaning step. Furthermore, this combination allows reducing the time of the hardening step as a result of its efficiency, resulting in an increase in core making productivity.

In the hardening step, furthermore, before applying microwaves and the drying stream, the inner space of the job box is closed in a leak-tight manner in the upper part thereof, with a lid configured for that purpose, the vertical movement of the lid toward the job box or of the job box toward the lid being caused in order to establish the leak-tight closure.

The drying stream is generated by applying suction on the inner space of the job box, from the outside of the inner space and from below or from above, the suction being applied through a suction plate which is arranged between the lid and the material present in the inner space of the job box, and with the suction plate in contact with the material. Applying suction with said contact prevents the granular material from moving around in the inner space when the drying stream is generated, which prevents a loss in efficiency.

A second aspect relates to an installation configured for making sand cores. The installation may comprise:
 a job box where the cores are generated and comprising a platform,
 a first station configured for housing the job box,
 making means which is associated with the first station and configured for generating the cores in an inner space demarcated by the job box, by means of 3D manufacturing, in which a plurality of layers of a granular material and of an additive that solidifies the granular material are applied in an alternating and selective manner on the platform of the job box,
 a second station configured for housing the job box,
 a conveyor device for moving the job box from the first station to the second station, and
 hardening means which is associated with the second station and configured for hardening the generated cores.

The hardening means comprise at least one device configured for applying microwaves in the inner space demarcated by the job box and a device configured for generating a drying stream in the inner space.

The installation further comprises, in the second station, a lid configured for closing the inner space of the job box in a leak-tight manner in the upper part thereof, movement means for moving the lid or the job box vertically in order to establish the leak-tight closure, and a suction plate attached to the lid with freedom of vertical movement. When the job box is in the second station, the suction plate is arranged between the lid and the platform of the job box. The stream generating device is configured for applying suction on the inner space through the suction plate and the lid.

The advantages that have been described for the method are also obtained with the installation.

These and other advantages and features will become evident in view of the drawings and the detailed description.

DETAILED DESCRIPTION

Figure 1:
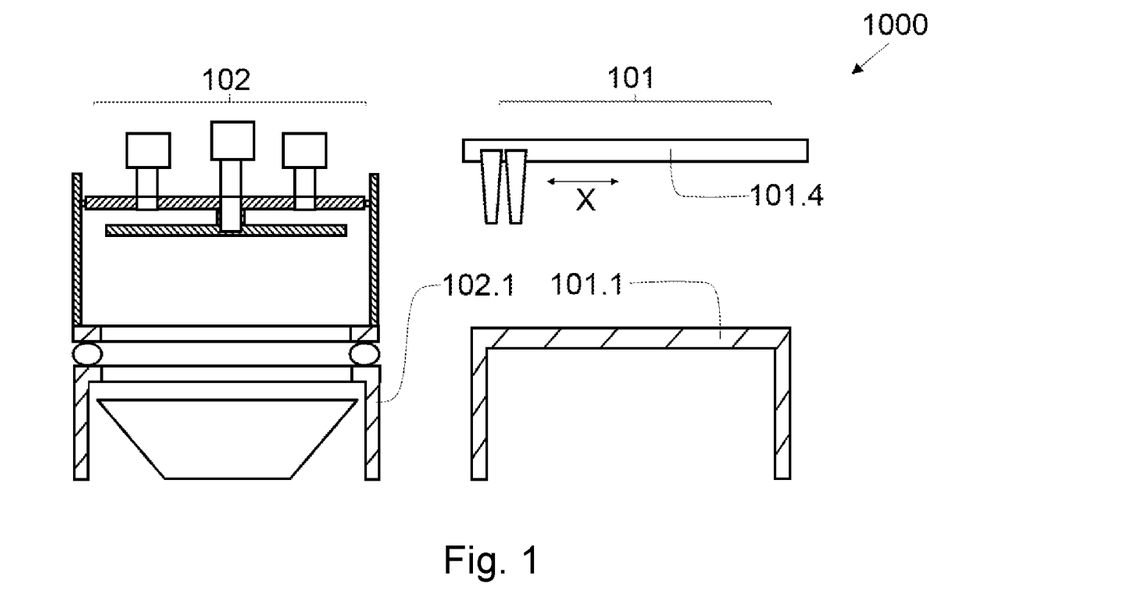
FIG. 1 shows in a schematic and simplified manner an installation according to one embodiment, without some of its elements (such as a conveyor device, for example).

A first aspect relates to a method for making sand cores, which is implemented in an installation 1000 suitable for making sand cores, such as the one shown in FIG. 1, for example.

Figure 2:
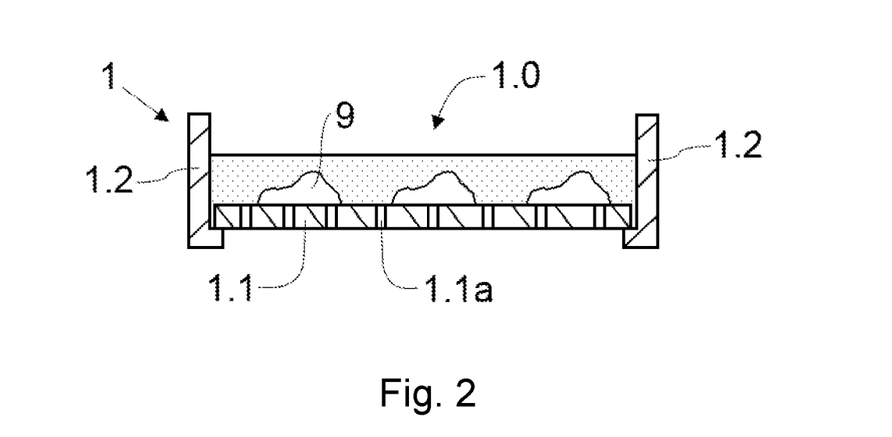
FIG. 2 shows a job box with a plurality of cores generated in the first station of the installation of FIG. 1.

In any of its embodiments, the method comprises at least the following steps:
- a generating step in which the cores 9 are generated with the desired shape in an inner space 1.0 demarcated by a job box 1 shown by way of example in FIG. 2, by means of 3D manufacturing (also known as additive manufacturing), in which a plurality of layers of a granular material (preferably sand) and of an additive that solidifies the granular material are applied in an alternating and selective manner on a platform 1.1 of the job box 1, and
- a hardening step in which the cores 9 generated in the generating step are hardened.

In the generating step, a single core 9 can be generated in the job box 1, or a plurality of cores 9 can be generated simultaneously in the job box 1. The generating step is furthermore implemented in a first station 101 of the installation 1000 shown in FIGS. 1 and 3.

The job box 1 comprises the platform 1.1 and a frame 1.2 between which the inner space 1.0 is demarcated. Preferably, the job box 1 is rectangular and comprises the platform 1.1 and four substantially vertical walls, the inner space 1.0 being demarcated on the platform 1.1 and between the four walls.

In the hardening step, in order to harden the cores 9 generated in the generating step without taking the cores 9 out of the job box 1, microwaves and at least one drying stream, preferably an air stream (although any other gaseous fluid such as nitrogen, for example, could be used), are applied in the inner space 1.0 of the job box 1 where the cores 9 are located. The combination of microwaves and the drying stream causes the rapid drying of the cores 9, and accordingly the hardening thereof. The microwave and/or drying stream application time depends on the requirements for the generated cores 9, and/or the shape and/or total volume of the cores 9 generated in the corresponding generating step, and both methods may or may not take place simultaneously (depending on requirements and needs).

Figure 3:
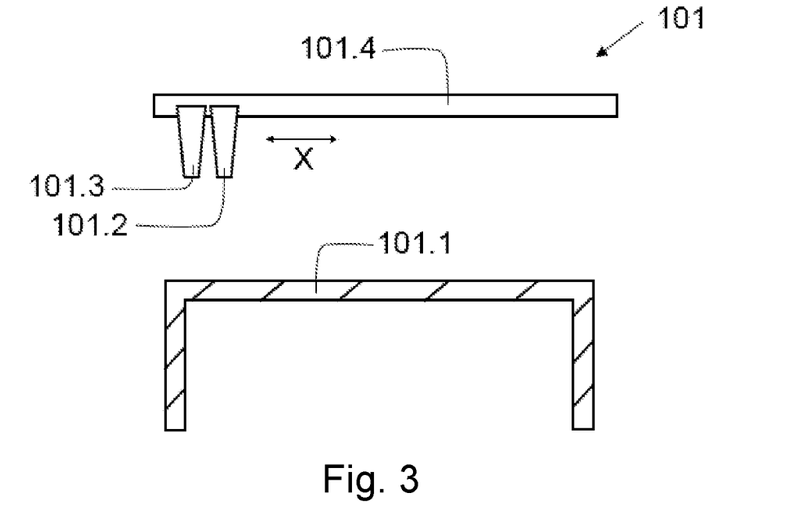
FIG. 3 shows in a schematic and simplified manner the first station of the installation of FIG. 1.
Figure 4:
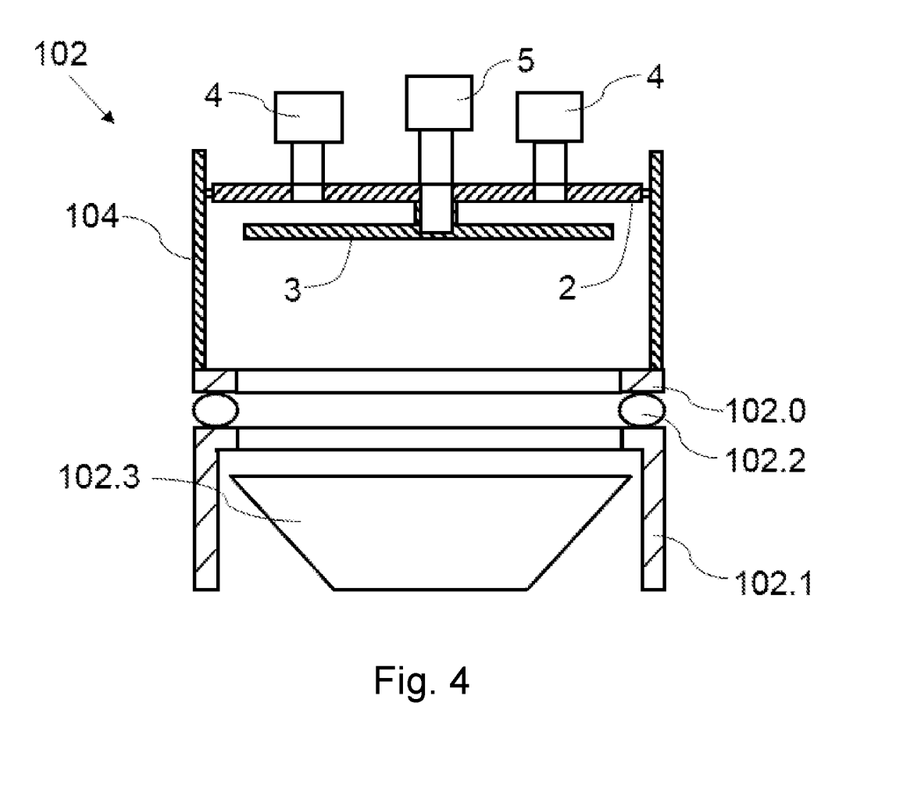
FIG. 4 shows in a schematic and simplified manner the second station of the installation of FIG. 1.

The generating step is implemented with the job box 1 in a first station 101 of the installation 1000, shown in FIG. 3 by way of example, and the hardening step is implemented in a second station 102 of the installation 1000, shown in FIG. 4 by way of example. In the method, after the generating step is performed in the first station 101, the job box 1 is conveyed to the second station 102, where the hardening step is implemented.

Figure 5:
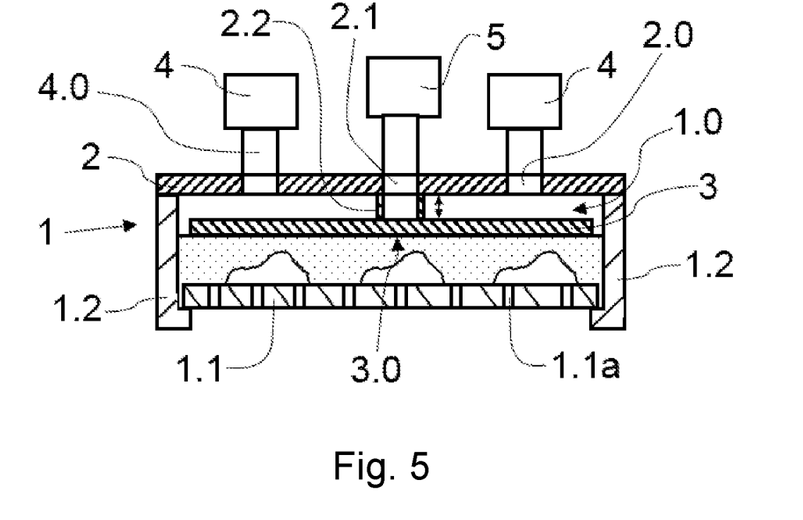
FIG. 5 shows the lid of the second station of the installation of FIG. 1, providing a leak-tight closure of the inner space defined in the job box.

During the generating step, the granular material and the corresponding additive are applied in the inner space 1.0 of the job box 1 on the platform 1.1, the cores 9 being generated after the generating step, therefore, in the inner space 1.0 on the platform 1.1 of the job box 1. In the hardening step, before applying microwaves and the drying stream, the inner space 1.0 is closed in a leak-tight manner in the upper part thereof, with the generated cores 9 located therein, by means of a lid 2 configured for that purpose. As a result of the leak-tight closure, the microwaves and the drying stream which are subsequently applied act more effectively on the cores 9. Preferably the vertical movement of the lid 2 toward the job box 1 is caused until the lid 2 comes into contact with the job box 1 in order to provide the leak-tight closure (situation shown in FIG. 5). In order to assure the leak-tight closure, the lid 2 is preferably supported on the job box 1 (on the frame 1.2 of the job box 1), there being a sealing gasket (not depicted in the drawings) between the frame 1.2 and the lid 2 (the sealing gasket can be attached to or associated with the lid 2, for example).

It is therefore not necessary to incorporate a microwave oven, for example, as occurs in the state of the art, and the job box 1 itself is utilized as a microwave receiver, resulting in an installation 1000 that costs less but does not sacrifice the benefits resulting from microwaves.

In the preferred embodiment, the microwaves are applied through the lid 2 by means of at least one microwave generating device 4, such as a magnetron, for example, the lid 2 comprising at least one through hole 2.0 through which the inner space 1.0 is communicated with the microwave generating device 4 and through which the microwaves are steered toward the inner space 1.0 of the job box 1. The microwave generating device 4 is communicated with the through hole 2.0 such that it is isolated from the outside, i.e., this communication does not interrupt the leak-tightness provided by the lid 2 in the inner space 1.0 of the job box 1, preferably by means of a conduit 4.0, for example.

The drying stream is generated by applying suction on the inner space 1.0 of the job box 1. The suction can be caused from below (from below the platform 1.1 of the job box 1), but in a preferred embodiment it is applied from above. In the latter embodiment, to enable generating the drying stream access to the outside of the job box 1, below the platform 1.1, is furthermore required in order to capture air that is present below the platform 1.1. The platform 1.1 thereby comprises in at least one suction area (not depicted in the drawings) a porosity which allows the passage of air therethrough, but not the passage of granular material. Therefore, when suction is applied from above the inner space 1.0, air from below the platform 1.1 is absorbed through the platform, a drying stream being generated from bottom to top through the inner space 1.0.

Suction is applied through a suction plate 3 which is arranged between the lid 2 and the material present in the inner space 1.0 of the job box 1, the suction preferably being applied with the suction plate 3 in contact with the material. Applying suction with the contact prevents the granular material from moving around in the inner space 1.0 when the drying stream is generated, which prevents a loss in efficiency.

The suction plate 3 is attached to the lid 2 by means of a column 2.2, preferably with freedom of vertical movement. This allows that when the lid 2 is moved to cause the leak-tight closure of the inner space 1.0 of the job box 1, if the suction plate 3 comes into contact with the material present in the inner space 1.0 before finishing this movement, the suction plate 3 stops moving even though the lid 2 continues to move. Excessive compacting of the material present in the inner space 1.0 and breaking of the cores 9 as a result are thereby prevented. In other embodiments, the suction plate 3 is fixed to the lid 2 without freedom of movement. In these embodiments, once the leak-tight closure of the inner space 1.0 of the job box 1 has been established, the platform 1.1 is moved toward the suction plate 3 until the material present in the inner space 1.0 comes into contact with the suction plate 3. Once the contact has been achieved, the platform 1.1 is immobilized and the drying stream is generated.

The surface area of the suction plate 3 facing the platform 1.1 is equal to or smaller than the analogous surface area of the platform 1.1, but it preferably covers at least the surface area of the job box 1 housing the cores 9. More effective suction on the cores 9 is thereby performed compared with a smaller surface area not covering the cores 9. Furthermore, if the efficiency of the suction plate 3 is to be even further improved, the suction plate 3 may comprise a chamber (not depicted in the drawings) along its contour which is inflated with a fluid (air for example) once the leak-tight closure is established in order to fix the suction plate 3 in place with respect to the job box 1 and to generate a leak-tight environment between the suction plate 3 and the platform 1.1 of the job box 1 (space where the cores 9 are located). Suction would be applied once the chamber has been inflated.

Preferably, suction is applied through the suction plate 3 by means of the stream generating device 5 configured for that purpose (a suction pump, for example), and through the lid 2. To that end, the lid 2 comprises at least one through hole 2.1 and the column 2.2 is hollow, the stream generating device 5 being communicated with the suction plate 3 through the through hole 2.1 and the hollow space of the column 2.2. The suction plate 3 comprises in at least one suction area 3.0 a given porosity which allows the passage of air therethrough, but not the passage of granular material in order to prevent excess or unsolidified granular material from getting out of the space demarcated between the job box 1 and the suction plate 3 through the suction plate 3 and heading toward the stream generating device 5 (which could result in a malfunction of the stream generating device 5, or even in the deterioration of the stream generating device 5), suction being applied through the suction area 3.0 (and not the rest of the suction plate 3).

Alternatively, the generating device 5 is arranged below the job box 1 (for the embodiments where the suction is applied from below the job box 1). In any embodiment, when the generating device 5 is arranged below the job box 1 and suction is applied through the suction plate 3, the drying stream passing through the suction plate 3 has previously pass through the job box 1, while when the generating device 5 is arranged above the job box 1 and suction is applied through the suction plate 3, the drying stream passing through the suction plate 3 has not previously pass through the job box 1, the job box 1 receiving the drying stream after passing through the suction plate 3.

Preferably, the lid 2 is made from a material suitable for withstanding microwaves, such as a dielectric or microwave-transparent material, such as Teflon or a high-density polyethylene, for example, such that the energy of the microwaves is transferred to the cores 9 present in the inner space 1.0 and not to the lid 2, which on one hand means that the properties of the lid 2 are not altered and the lid 2 has a long service life, and on the other hand that the lid 2 itself does not become hot and does not capture energy from the microwaves, the greatest possible amount of energy from the microwaves being utilized for the drying or hardening of the cores 9. Preferably, in the same manner, the job box 1 and/or suction plate 3 are also made from a material suitable for withstanding microwaves, which can be the same material from which the job box 1 is made.

In a preferred embodiment, the method comprises a cleaning step after the hardening step. In the cleaning step, the excess or unsolidified granular material existing around the cores 9 is discharged from the job box 1. As a result of the prior hardening step, an effective cleaning step without the risk of the cores 9 breaking is allowed.

In order to perform the cleaning step, the job box 1 can be conveyed to a third station of the installation 1000, but in the preferred embodiment the cleaning step is implemented in the second station 102 of the installation 1000, like the hardening step is, which reduces process times.

In the preferred embodiment, both the microwaves and the drying stream are introduced in the inner space 1.0 through the lid 2, such that they do not act below the job box 1 and the space can be free. The excess material can thereby be discharged below the job box 1, and to that end the platform 1.1 of the job box 1 comprises a plurality of discharge holes 1.1a through which the excess or unsolidified granular material is discharged from the inner space 1.0 of the job box 1. The discharge holes 1.1a are closed during the generating and hardening steps and are opened during the cleaning step so as to allow the discharge of the excess granular material. The size of the discharge holes 1.1a is obviously greater than the size of the grains of the granular material so as to enable the discharge. The discharge holes 1.1a are therefore opened in a controlled manner.

Figure 6:
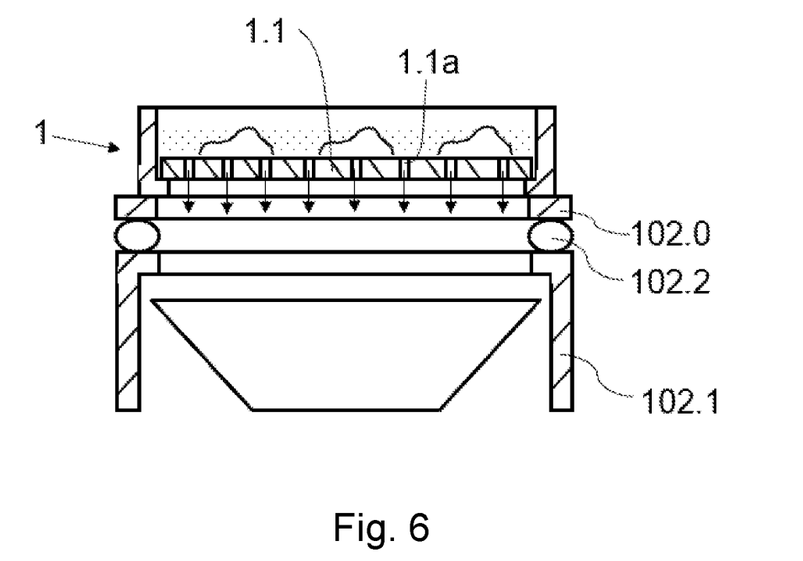
FIG. 6 shows the job box of FIG. 2 arranged on the structure and the cleaning platform of the second station of the installation.

In the preferred embodiment, the second station 102 comprises a structure 102.1 and a cleaning platform 102.0 arranged on the structure 102.1 and attached to the structure 102.1, as shown in FIGS. 4 and 6. The cleaning platform 102.0 is a hollow frame. The job box 1 is arranged on the cleaning platform 102.0 when the job box 1 is conveyed to the second station 102, and it is coupled to the cleaning platform 102.0. During the cleaning step, in addition to the discharge holes 1.1a of the platform 1.1 being opened, in some embodiments a controlled tilting of the cleaning platform 102.0 in different directions is caused in order to cause the tilting of the job box 1 in different directions and thereby cause a movement of the excess granular material present in the inner space 1.0 of the job box 1, making the discharge thereof through the discharge holes 1.1a easier (discharge into a container 102.3 arranged below the cleaning platform 102.0, for example). A controlled movement of the cleaning platform 102.0 is generated in order to cause the tilting. The cleaning platform 102.0 is supported on a plurality of support areas of the second station 102, which are movable in height, and the controlled vertical movement of the support areas is generated in order to cause the mentioned tilting.

In order to cause the tilting, the installation 1000 comprises a plurality of inflatable elements 102.2 in the second station 102 which are arranged between the structure 102.1 and the cleaning platform 102.0, distributed such that each of them comes into contact with a different area of the cleaning platform 102.0. Each inflatable element 102.2 comprises at least one of the support areas on which the cleaning platform 102.0 is supported, and the controlled inflation and deflation of each of the inflatable elements 102.2 is caused in order to cause the desired tilting of the cleaning platform 102.0 and the job box 1 coupled to the cleaning platform 102.0. The inflatable elements 102.2 are controlled in an independent manner, each inflatable element 102.2 preferably comprising a single respective support area.

The cleaning platform 102.0 comprises a base with the same shape as the job box 1, which is rectangular in the preferred embodiment, the cleaning platform 102.0 thereby being supported on four support areas in the preferred embodiment. Each support area is close to or below one of the corners of the cleaning platform 102.0, and an inflatable element 102.2 such as the ones described above corresponds to each support area.

During the cleaning step, the lid 2 can continue to provide the leak-tight closure, in which case it will be attached to the cleaning platform 102.0 by means of a structure 104 so as to be tilted to the same extent as the cleaning platform 102.0, and, therefore, to the same extent as the job box 1, or it can be separated from the job box 1 (in which case the structure 104 is not required).

For cleaning, vibration alone of the job box 1 or vibration combined with the tilting of the job box 1 can be generated in order to move the unsolidified granular material around.

In other embodiments of the method, the drying stream is generated by applying suction from below the job box 1 through the platform 1.1, as described before. In these embodiments, the installation 1000 comprises a third station to where the job box 1 is conveyed after the hardening step, the cleaning step being implemented in the third station.

In other examples, the drying stream is generated by means of the injection of air or another gaseous fluid instead of by means of suction, and in other embodiments it is generated by means of the combination of injection and suction.

In any embodiments, the drying stream applied in the inner space 1.0 of the job box 1 can be generated such that it is forced to penetrate the core 9 arranged inside the job box 1. Therefore, the drying stream acts effectively not only upon the external surface of the core 9, as would occur when a mere air supply is applied in the inner space, the drying of the core being carried out more effectively.

A second aspect relates to an installation 1000 configured for making sand cores 9. The installation 1000 may comprise:
  a job box 1 where the cores 9 are generated and comprising a platform 1.1,
  a first station 101 configured for housing the job box 1,
  making means which are associated with the first station 101 and configured for generating the cores 9 in an inner space 1.0 demarcated by the job box 1, by means of 3D manufacturing, in which a plurality of layers of a granular material and of an additive that solidifies the granular material are applied in an alternating and selective manner on the platform 1.1 of the job box 1,
  a second station 102 configured for housing the job box 1,
  a conveyor device (not depicted in the drawings) for moving the job box 1 from the first station 101 to the second station 102, and
  hardening means which is associated with the second station 102 and configured for hardening the generated cores 9.

The first station 101 comprises at least one structure 101.1 on which the job box 1 is arranged (the job box 1 is preferably coupled to the structure 101.1). The making means associated with the first station 101 are arranged in the first station 101, the first station comprising the making means. The making means comprise at least two heads 101.2 and 101.3, a first head 101.2 which is in charge of applying the layers of granular material, and a second head 101.3 which is in charge of applying the layers of additive. Preferably both heads 101.2 and 101.3 are attached to a second structure 101.4 of the first station 101 with freedom of movement in a horizontal direction X. The second structure 101.4 may further be comprised in the making means.

The hardening means comprises at least one microwave generating device 4, and a stream generating device 5 configured for generating a drying stream. Both devices 4 and 5 are suitable for being communicated with the inner space 1.0 of the job box 1 when the job box 1 is arranged in the second station 102.

The installation 1000 comprises, in the second station 102, a lid 2 such as the one discussed for the method, and movement means (not depicted in the drawings) for moving the lid 2 toward the job box 1 or for moving the job box 1 toward the lid 2 in order to establish the leak-tight closure between the job box 1 and the lid 2. The description provided for the method with respect to the leak-tight closure is also valid for the installation 1000, in any of its embodiments and/or configurations, and will not be explained again for the installation 1000.

The microwave generating device 4 is furthermore configured for steering the microwaves into the inner space 1.0 of the job box 1 through the lid 2, the lid 2 comprising at least one through hole 2.0 to enable the passage of the microwaves therethrough toward the inner space 1.0, and the lid 2 preferably comprising a material suitable for withstanding the microwaves as described for the method. The communication between the microwave generating device 4 and the through hole 2.0 can be established by means of a conduit 4.0 configured for that purpose, for example. The microwave generating device 4 may comprise a magnetron and may be arranged in the second station 102 in a fixed manner. If it is the lid 2 that is moved to generate the leak-tight closure described above, then it is the conduit 4.0 communicating the microwave generating device 4 with the through hole 2.0 that moves (the conduit 4.0 therefore being flexible).

The installation 1000 comprises a suction plate 3, preferably attached to the lid 2 with freedom of vertical movement, and when the job box 1 is in the second station 102, the suction plate 3 is arranged between the lid 2 and the platform 1.1 of the job box 1, and the stream generating device 5 is configured for applying suction on the inner space 1.0 through the suction plate 3 and the lid 2 (from above or from below the inner space 1.0). The description provided with respect to the suction plate 3 for the method is also valid for the installation 1000, in any of its embodiments and/or configurations, and will not be explained again for the installation 1000, the generating device 5 being preferably configured for applying the suction with the suction plate 3 in contact with the material present in the inner space 1.0.

The attachment between the suction plate 3 and the lid 2 can be established, for example, by means of a column 2.2, and the suction plate 3 can be moved with respect to the column 2.2.

The stream generating device 5 is configured for applying suction through the suction plate 3, as described for the method. Furthermore, in a preferred embodiment the stream generating device 5 is arranged outside of the inner space 1.0 after the leak-tight closure thereof has been established and is communicated with the lid 2 by means of a conduit 5.0 specific for that purpose. The lid 2 further comprises a through hole 2.1 communicated with the stream generating device 5 so as to allow the generation of the suction through the suction plate 3. Furthermore, the column 2.2 is partially hollow and is communicated with the through hole 2.1 (it is preferably aligned with the through hole 2.1), and the suction area 3.0 is communicated with the column 2.2 (with the hollow space of the column 2.2), such that the suction generated from the stream generating device 5 reaches the inner space 1.0 demarcated by the job box 1. In other preferred embodiments, the generating device 5 is arranged below the job box 1 (for the embodiments where the suction is applied from below the job box 1). In the embodiments with the generating device 5 arranged below the job box 1 and the suction being applied through the suction plate 3, the drying stream passing through the suction plate 3 has previously pass through the job box 1, while in the embodiments with the generating device 5 arranged above the job box 1 and the suction being applied through the suction plate 3, the drying stream passing through the suction plate 3 has not previously pass through the job box 1, the job box 1 receiving the drying stream after passing through the suction plate 3.

As described for the method, in one preferred embodiment the devices 4 and 5 do not interfere below the job box 1. In the preferred embodiment, the second station 102 of the installation 1000 comprises a cleaning platform 102.0 which is arranged on a structure 102.1 of the second station 102, and the job box 1 and the cleaning platform 102.0 are configured to enable being coupled to one another. The platform 1.1 of the job box 1 comprises a plurality of discharge holes 1.1a with controlled opening, as described for the method (which explanation is also valid for the installation 1000), through which the granular material can be discharged from the inner space 1.0 of the job box 1. The cleaning platform 102.0 comprises a frame which is what is coupled to the job box 1, and the frame is hollow (or partially hollow), allowing the excess granular material that is discharged from the job box 1 through the discharge hole 1.1a of the platform 1.1 to fall through same and to be collected for subsequent conveyance to wherever it is required (to be disposed of, or even to be reutilized if possible).

Figure 7A:
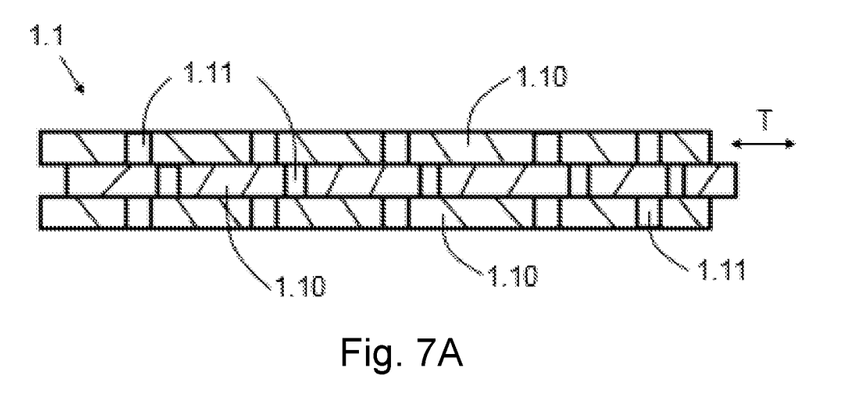
FIG. 7A shows in further detail the platform of the job box of FIG. 2, with the holes of the platform being closed.
Figure 7B:
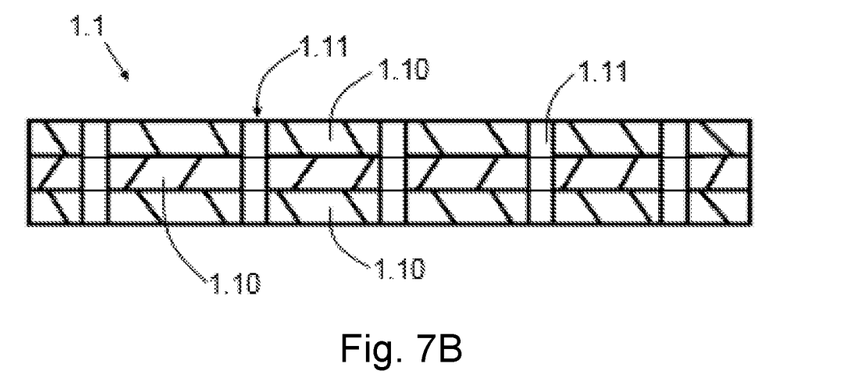
FIG. 7B shows in further detail the platform of the job box of FIG. 2, with the holes of the platform being open.

In the preferred embodiment, the platform 1.1 is formed by a plurality of parallel plates 1.10, preferably three in number, arranged one above another like a sandwich. Each plate 1.1b comprises a plurality of through holes 1.11, and in order to open the holes 1.1a of the platform 1.1 the movement of at least one of the plates 1.10 is caused in a transverse direction T, such that the holes 1.11 of the different plates 1.10 are aligned and allow the passage of the unsolidified binding material through the platform 1.1, as shown by way of example in FIG. 7B. Therefore, when the holes 1.11 of the different plates 1.10 are aligned, it can be the that the holes 1.1a are open, since passage of the unsolidified granular material through them, out of the job box 1, is allowed.

Figure 8:
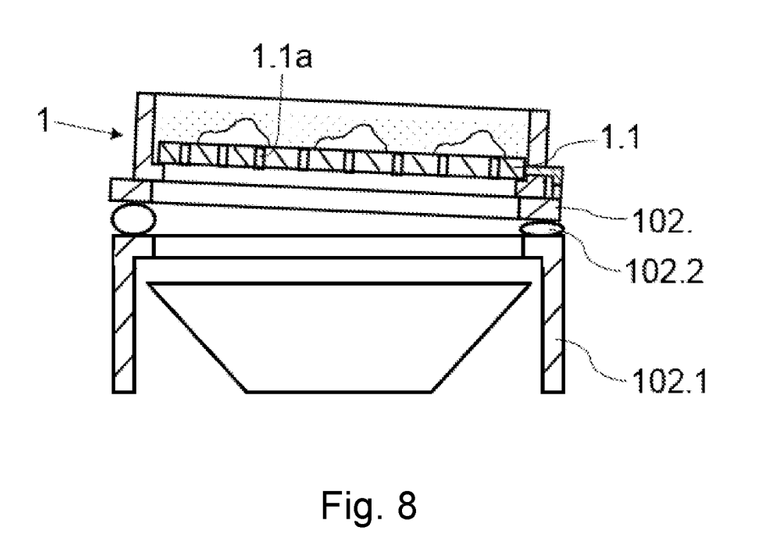
FIG. 8 shows the job box of FIG. 2 arranged on the structure and the cleaning platform of the second station of the installation being tilted.

As described for the method, the cleaning platform 102.0 is supported on a plurality of support areas that are movable in height in a controllable and independent manner, a controlled tilting of the job box 1 in different directions being generated with the controlled movement of the support areas, such as that shown by way of example in FIG. 8. The cleaning platform 102.0 preferably comprises a rectangular base (in the preferred embodiment, as described for the method), the cleaning platform 102.0 being supported on four support areas and each support area being close to or below one of the corners of the cleaning platform 102.0.

The second station 102 comprises a plurality of inflatable elements 102.2 arranged between the structure 102.1 and the cleaning platform 102.0, each inflatable element 102.2 comprising at least one of the support areas on which the cleaning platform 102.0 is supported, the inflatable elements 102.2 being configured to be controlled in an independent manner, being inflated or deflated in a controlled manner in order to cause the vertical movement of the corresponding support area.

For cleaning, the installation may comprise a vibration generating device (not depicted in the drawings) in order to cause vibration of the job box 1 so as to move the unsolidified granular material around. The device can be used alone or combined with the means for tilting the job box 1.

In any embodiments, the stream generating device 5 is adapted for causing the drying stream applied in the inner space 1.0 of the job box 1 to be forced to penetrate the core 9 arranged inside the job box 1. Therefore, the drying stream acts effectively not only upon the external surface of the core, as would occur when a mere air supply is applied in the inner space, the drying of the core being carried out more effectively.

The installation 1000 is configured so as to enable implementing the methods described above in any of its embodiments and/or configurations, and vice versa. The description provided with respect to the method is therefore also valid for the corresponding embodiments/configurations of the installation 1000, and the description provided with respect to the installation 1000 is therefore also valid for the corresponding embodiments/configurations of the method.

Additional embodiments are disclosed in the following clauses.

Clause 1. A method for making sand cores, comprising a generating step in which at least one core 9 is generated with the desired shape in an inner space 1.0 demarcated by a job box 1, by means of 3D manufacturing in which a plurality of layers of a granular material and of an additive that solidifies the granular material are applied in an alternating and selective manner on a platform 1.1 of the job box 1, and a hardening step in which the core 9 generated in the generating step is hardened, the generating step is implemented with the job box 1 in a first station 101 of an installation 1000 and the hardening step is implemented in a second station 102 of the installation 1000, the job box 1 being conveyed to the second station 102 where the hardening step is implemented, after the generating step is performed in the first station 101, in the hardening step, in order to harden the core 9 generated in the generating step microwaves and a drying stream are applied in the inner space 1.0 of the job box 1 where the core 9 is arranged, in the hardening step, before applying microwaves and the drying stream, the inner space 1.0 of the job box 1 is closed in a leak-tight manner in the upper part thereof, with a lid 2 configured for that purpose, the vertical movement of the lid 2 toward the job box 1 or of the job box 1 toward the lid 2 being caused in order to establish the leak-tight closure, the drying stream being generated by applying suction on the inner space 1.0 of the job box 1, from the outside of the inner space 1.0 and from below or from above, the suction being applied through a suction plate 3 which is arranged between the lid 2 and the material present in the inner space 1.0 of the job box 1, and with the suction plate 3 in contact with the material.

Clause 2. The method according to clause 1, wherein the microwaves are applied from the outside of the inner space 1.0 of the job box 1 and through the lid 2, the lid 2 comprising at least one through hole 2.0 through which the microwaves are steered toward the inner space 1.0 of the job box 1.

Clause 3. The method according to clause 1 or 2, wherein the suction is generated from above the inner space 1.0 of the job box 1, through the lid 2 and the suction plate 3, the platform 1.1 comprising a given porosity in at least one suction area which allows the passage of air therethrough, but not the passage of granular material.

Clause 4. The method according to clause 3, wherein the suction plate 3 comprises a given porosity in at least one suction area 3.0 which allows the passage of air therethrough, but not the passage of granular material, the suction being applied through the suction area 3.0.

Clause 5. The method according to clause 3 or 4, wherein the job box 1 is coupled to a structure 102.1 of the second station 102 and the hardening step being implemented in the second station 102 with the job box 1 coupled to the structure 102.1, the method comprising a cleaning step after the hardening step, which is implemented with the job box 1 in the second station 102 and in which the excess granular material is separated from the core 9 and the excess granular material is discharged from the inner space 1.0 of the job box 1 through the platform 1.1 of the job box 1.

Clause 6. The method according to clause 5, wherein the platform 1.1 of the job box 1 comprises a plurality of discharge holes 1.1a for discharging therethrough the excess granular material from the inner space 1.0 of the job box 1, the plurality of discharge holes 1.1a being opened in a controlled manner during the cleaning step so as to allow the discharge, the structure 102.1 of the second station 102 comprising a cleaning platform 102.0 on which and to which the job box 1 is arranged and coupled when the job box 1 is coupled to the structure 102.1.

Clause 7. The method according to any of clauses 1 to 6, wherein the drying stream applied in the inner space 1.0 of the job box 1 is generated such that it is forced to penetrate the core 9 arranged inside the job box 1.

Clause 8. An installation configured for making sand cores, the installation 1000 comprising a job box 1 where at least one core 9 is generated and comprising a platform 1.1, a first station 101 configured for housing the job box 1, making means which are associated with the first station 101 and configured for generating the cores 9 in an inner space 1.0 demarcated by the job box 1, by means of 3D making in which a plurality of layers of a granular material and of an additive that solidifies the granular material are applied in an alternating and selective manner on the platform 1.1 of the job box 1, a second station 102 configured for housing the job box 1, a conveyor device for moving the job box 1 from the first station 101 to the second station 102, and hardening means which are associated with the second station 102 and configured for hardening the cores 9 generated in the first station 101, the hardening means comprise at least one microwave generating device 4 and for applying them to the inner space 1.0 demarcated by the job box 1 when the job box 1 is in the second station 102, and a stream generating device 5 configured for generating a drying stream in the inner space 1.0 when the job box 1 is in the second station 102, the installation 1000 further comprising, in the second station 102, a lid 2 configured for closing the inner space 1.0 of the job box 1 in a leak-tight manner in the upper part thereof, movement means for moving the lid 2 or the job box 1 vertically in order to establish the leak-tight closure, and a suction plate 3 attached to the lid 2 with freedom of vertical movement, and when the job box 1 is in the second station 102, the suction plate 3 being arranged between the lid 2 and the platform 1.1 of the job box 1, and the stream generating device 5 being configured for applying suction on the inner space 1.0 through the suction plate 3 and the lid 2 for generating the drying stream.

Clause 9. The installation according to clause 8, wherein the microwave generating device 4 is attached to the lid 2 and communicated with at least one through hole 2.0 of the lid 2, such that the microwaves it generates reach the inner space 1.0 of the job box 1 through the through holes 2.0 of the lid 2, the lid 2 preferably comprising a material suitable for withstanding microwaves.

Clause 10. The installation according to clause 8 or 9, wherein the stream generating device 5 is communicated with the suction plate 3 through the lid 2 and is configured for applying the suction from above the inner space 1.0 and through the lid 2 and the suction plate 3.

Clause 11. The installation according to clause 10, wherein the suction plate 3 is attached to the lid 2 by means of a hollow column 2.2, the lid 2 comprising a through hole 2.1 communicated with the hollow space of the column 2.2 and the hollow space being communicated with the suction plate 3, the stream generating device 5 being communicated with the through hole 2.1 of the lid 2, such that it is communicated with the suction plate 3 through the through hole 2.1 and the hollow space of the column 2.2.

Clause 12. The installation according to clause 10 or 11, wherein the suction plate 3 comprises a given porosity in at least one suction area 3.0 which allows the passage of air therethrough, but not the passage of granular material, and the lid 2 comprises at least one through hole 2.0 communicated with the stream generating device 5 and with the suction area 3.0.

Clause 13. The installation according to any of clauses 8 to 12, wherein the second station 102 comprises a structure 102.1 with a cleaning platform 102.0, the job box 1 and the cleaning platform 102.0 being configured so as to allow coupling therebetween so as to generate the drying stream, the platform 1.1 comprising a plurality of discharge holes 1.1a with a controlled opening through which the excess granular material can be discharged from the inner space 1.0 of the job box 1, and the installation 1000 comprising in the second station 102 means for generating the opening.

Clause 14. The installation according to any of clauses 8 to 13, wherein the stream generating device 5 is adapted for causing the drying stream applied in the inner space 1.0 of the job box 1 to be forced to penetrate the core 9 arranged inside the job box 1.

What is claimed is:

1. An apparatus for making a sand core, the apparatus comprising:
   a job box having an inner space in which the sand core is generated, the job box including a platform;
   a first station configured to house the job box and to generate in an inner space of the job box the sand core so that the sand core is made of a plurality of layers of a granular material and an additive that solidifies the granular material, the first station being configured to apply the granular material and the additive in an alternating manner on the platform of the job box;
   a second station different than the first station configured to house the job box after the job box is housed in the first station;
   a lid for closing an upper part of the job box when the job box is in the second station;
   a microwave generating device for applying microwaves to the sand core through a first through hole in the lid when the job box is in the second station;
   a drying stream generating device configured to generate a drying stream in the inner space when the job box is in the second station by applying suction on the inner space from outside of the inner space; and
   a suction plate attached to the lid with freedom of vertical movement through which the suction is applied to the inner space, the suction plate located in the inner space between the lid and the platform of the job box.

2. The apparatus according to claim 1, wherein the lid is configured to close the upper part of the job box in a leak-tight manner.

3. The apparatus according to claim 1, wherein the lid or the job box is vertically movable in order to close the upper part of the job box.

4. The apparatus according to claim 1, wherein the drying stream generating device is located above the inner space of the job box, the lid having a second through hole communicating the drying stream generating device with the suction plate.

5. The apparatus according to claim 1, wherein the suction plate comprises a suction area of a given porosity which allows a passage of a gas therethrough, but not the passage of the granular material.

6. The apparatus according to claim 1, wherein the microwave generating device is attached to the lid.

7. The apparatus according to claim 4, wherein the suction plate is attached to the lid by a hollow column, the second through hole of the lid being in fluid communication with an inner hollow space of the hollow column, the inner hollow space being in fluid communication with the suction plate.

8. The apparatus according to claim 1, wherein the second station includes a structure with a cleaning platform, the job box and the cleaning platform being configured so as to allow coupling therebetween, the platform of the job box including a plurality of discharge holes that may be opened and closed such that when the plurality of discharge holes are opened, an excess of granular material can be discharged from the inner space of the job box to a location outside the job box.

9. The apparatus according to claim 1, wherein the drying stream generating device is configured to cause the drying stream applied in the inner space of the job box to be forced to penetrate the sand core arranged inside the job box.

* * * * *